Aug. 28, 1956 G. V. WOODLING 2,760,796

WELDABLE HOLLOW BODY

Filed Aug. 18, 1951

INVENTOR.

BY George V. Woodling 2,760,796
Patented Aug. 28, 1956

2,760,796

WELDABLE HOLLOW BODY

George V. Woodling, Rocky River, Ohio

Application August 18, 1951, Serial No. 242,538
8 Claims. (Cl. 287—20.2)

My invention relates to weldable hollow bodies which are adapted to be electrically welded to a plate or other metal part.

An object of my invention is the provision of a hollow body having a cap which holds flux in the end of the body and which facilitates the location of said hollow body with reference to a hole in a plate to which the hollow body is to be welded.

Another object of my invention is the provision of a weldable hollow body preferably constructed of steel or iron having a cap which holds flux in the end of the body, which cap or a pin connected thereto may be preferably constructed of metal having a lower melting point and a greater conductivity than that of the steel or iron hollow bodies and being of the class including at least magnesium, copper, aluminum, tin, silver, zinc, gold, lead, lithium, beryllium, antimony and nickel, and their alloys.

Another object of the invention is the provision of a weldable hollow body having at the end thereof a readily fusible or volatilizable metal different from that of the hollow body to aid in establishing an arc.

A further object of my invention is the provision of a weldable hollow body having an end surface which facilitates welding of large diameter hollow bodies to a plate or other metal part.

Another object of my invention is the provision of a weldable hollow body having in the end thereof an annular recess containing flux covered by a cap of volatilizable metal.

Another object of my invention is the provision of confining the flux in a recess by a cap having an edge constituting an arc initiating path which burns away to release the cap.

A further object of my invention is the provision of a centering portion which keeps splattering metal from entering the hole of the plate to which the hollow body is to be welded.

Other objects and a fuller understanding of this invention may be had by referring to the following description and claims, taken in conjunction with the accompanying drawings, in which:

Figure 1:
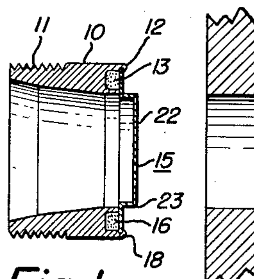
Figure 1 is a side view of a hollow body embodying the features of my invention, parts being shown in section to better illustrate the construction of the end of the hollow body.
Figure 2:
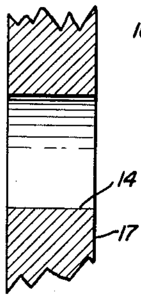
Figure 2 is a cross-sectional view of a plate having a hole to which the hollow body is to be welded.
Figure 3:
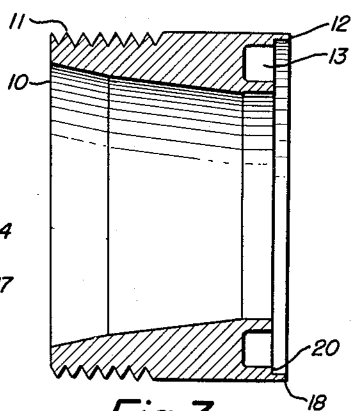
Figure 3 is an enlarged view of the hollow body shown in Figure 1 preparatory to mounting the cap thereon.
Figure 4:
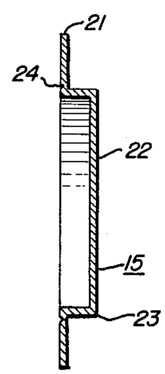
Figure 4 is a cross-sectional view of a cap preparatory to mounting same on the end of the hollow body in Figure 3.
Figure 5:
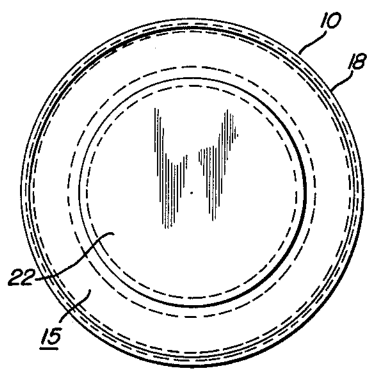
Figure 5 is an enlarged end view of Figure 1.

The weldable bodies shown and described herein are particularly adaptable for use in my welding device disclosed in my pending application, Serial No. 489,472, which is a continuation-in-part of my application Serial No. 242,540, filed August 18, 1951, now abandoned, in which the welding arc is magnetically controlled to cause it to rotate with rapid speed in a circular or annular path between the end of the weldable body and the plate to which the body is being welded.

With reference to Figures 1 to 5, inclusive, the hollow body is illustrated by the reference character 10 and is provided with a threaded portion 11 which may be of any suitable length and size to accommodate the purpose for which it is to be used and is preferably made of steel or iron. The welding end of this stud is indicated by the reference character 12 and comprises an annular recess 13 for confining flux material 16 over which a cap 15 is mounted to confine the flux in the recess. The annular recess 13 is provided with an annular shoulder 20 against which the outer annular edge 21 of the cap 15 fits. The center part of the cap 15 is provided with a projection centering portion 22 which fits into a hole 14 in a plate 17 to which the hollow body is to be welded. After the annular recess 13 is filled with flux material and after the cap 15 is mounted over the recess, the peripheral edge 18 of the hollow body is crimped inwardly by a tool which operates to hold the cap to the end of the hollow body for confining the flux in the annular recess. The outer annular edge 21 of the cap makes a firm press fit within the annular shoulder 20. The centering portion 22 is of a size as to slidably fit in the hole 14, which facilitates the centering of the hollow body on a plate or other metal part to which the body is to be welded.

The electrical arc is initially struck on the centering portion 22 at a corner edge 23, but the moment it is struck the arc becomes magnetically controlled, whereby it is caused to move outwardly toward the outer peripheral surface of the end of the hollow body so that a complete and sound weld is effected between the outer peripheral end surface and the plate to which the hollow body is welded. The centering portion 22 burns away sufficiently as to permit the remaining part to be easily removed from the hole after the welding operation is complete. The cap may be provided with an annular weakened groove 24 so that the center portion constitutes a knock-out part in the event it does not completely burn away.

The arc rotates with rapid speed in a circular or annular path between the end of the weldable hollow body and the plate to which the body is being welded. When the end surface is properly melted, the entire body is pressed against the plate to make a firm weld.

Figure 6:
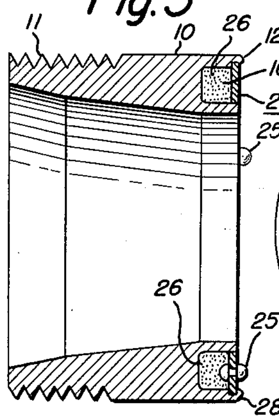
Figure 6 is an enlarged view of a modified form of a hollow body embodying the features of my invention.
Figure 7:
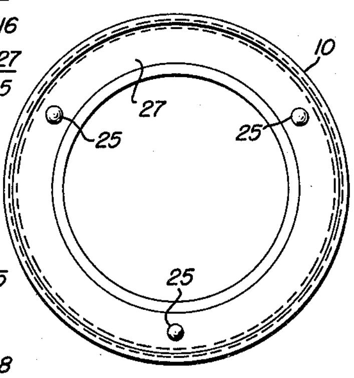
Figure 7 is an end view of Figure 6.

In Figures 6 and 7, a modified form of the invention is shown in that the recess 26 is covered by an annular cap 27. The inner edge of the cap 27 fits against the inner wall of the recess, and the outer edge of the cap 27 fits against a shoulder in the recess, after which the peripheral edge is annularly crimped at 28 to hold the cap over the recess. The cap 27 is provided with fusible pins 25 (three of which are illustrated in the drawing, but any number of which may be employed). The pin is preferably made of metal having a lower melting point and a greater conductivity than that of the steel or iron hollow body and being of the class including at least magnesium, copper, aluminum, tin, silver, zinc, gold, lead, lithium, beryllium, antimony and nickel, and their alloys. The pin 25 has a low boiling point below that of the steel or iron hollow body and readily volatilizes when the arc is initially struct in order to provide immediate ionization which enables the arc to become immediately a good, strong arc for the beginning of the welding process.

Figure 8:
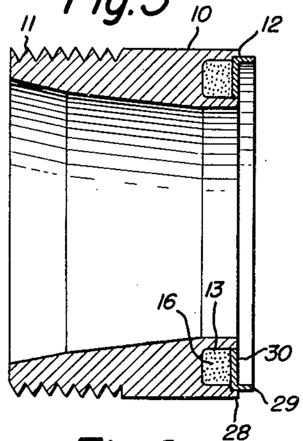
Figure 8 is a further modified form of the invention.

In Figure 8 the invention is the same as that shown in Figures 6 and 7 except that the outer annular edge 29 of a cap 30 is bent away from the end of the hollow body to provide an annular flange or path for the arc to initially strike. The burning away or melting of the flange releases the cap from the recess.

Figure 9:
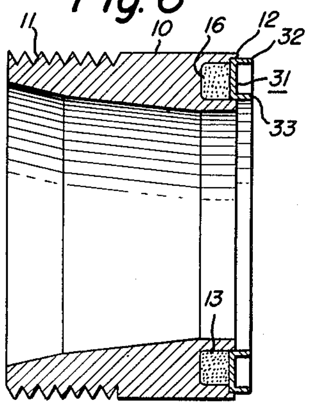
Figure 9 is a still further modified form of the invention.

In Figure 9, a cap 31 is provided with both an outer and an inner flange 32 and 33, instead of one flange as shown in Figure 8. Otherwise, the two hollow bodies are alike.

Figure 10:
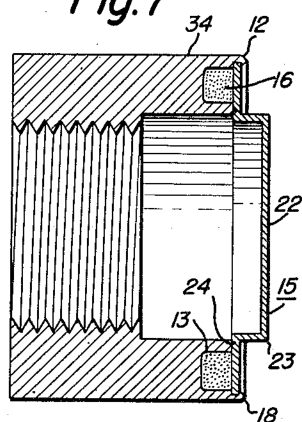
Figure 10 shows a nut into which my invention may be applied.

In Figure 10, the invention of Figure 1 is shown as being applied to a nut 34. The embodiment of the other views may also be applied to the nut. One benefit from my invention is that the nut or the hollow bodies need not be pressed too hard against the plate 17 in order to make a firm, sound weld. Thus, the threads retain their original shape and form and there is no distortion from the press operation.

The cap may also preferably be made of metal having a lower melting point and a greater conductivity than that of the steel or iron hollow body and being of the class including at least magnesium, copper, aluminum, tin, silver, zinc, gold, lead, lithium, beryllium, antimony and nickel, and their alloys. The cap when so made of the above listed metals provides for establishing a good, strong arc as soon as the arc is initially struck. When nickel is used for the pins 25, since they are non-magnetic, this tends to facilitate the withdrawal of the hollow body away from the surface to which it is being welded.

Although this invention has been described in its preferred form with a certain degree of particularlity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A weldable element having an end provided with outer and inner annular walls radially spaced from each other and defining an annular recess, flux means in said recess, a separable annular cap for said recess and fastened to said end to confine the flux, said cap having outer and inner annular edges engaged respectively by said outer and inner annular walls, the engagement of one of said edges and walls holding said cap over the recess.

2. A weldable element having an end provided with outer and inner annular walls radially spaced from each other and defining an annular recess, flux means in said recess, an annular cap for said recess and fastened to said end to confine the flux, said cap having outer and inner annular edges engaged respectively by said outer and inner annular walls, one of said annular edges projecting beyond said end of the weldable element.

3. A weldable element having an end provided with outer and inner annular walls radially spaced from each other and defining an annular recess, flux means in said recess, an annular cap for said recess and fastened to said end to confine the flux, said cap having outer and inner annular edges engaged respectively by said outer and inner annular walls to hold said cap over the recess, said annular edges projecting beyond said end of the weldable element.

4. A weldable element comprising a tubular body having an end provided with outer and inner annular walls radially spaced from each other and defining an annular recess, flux means in said recess, a separable annular cap for said recess and fastened to said end to confine the flux, said cap having outer and inner annular edges engaged respectively by said outer and inner annular walls.

5. A weldable element comprising a tubular body with a bore extending therethrough, said tubular body having an annular recess in an end thereof, flux means in said annular recess, a cap for said annular recess and fastened to said end to confine the flux means, said cap having a centrally disposed portion extending beyond said end of the weldable element and across said bore to facilitate location of said weldable element.

6. A weldable element comprising a tubular body with a bore extending therethrough, said tubular body having an end provided with outer and inner annular cylindrical walls radially spaced from each other and defining an annular cylindrical recess, flux means in said recess, a cap for said recess and fastened to said end to confine the flux, said cap having an outer annular edge engaged by said outer wall to hold said cap over said recess, said cap having a centrally disposed portion extending beyond said end of the weldable element and across said bore to facilitate location of said weldable element.

7. A weldable hollow body for welding one end thereof to a welding surface having an aperture therein, said hollow body being a generally cylindrical ferrous body having an outer annular wall and an inner annular wall defining a generally cylindrical opening therein, an outer and an inner annular surface defining a recess at the end of said hollow body between said outer and inner annular walls, a shoulder in said outer annular surface, flux in said recess, a separable metal cap having an annular washer portion covering said recess and having an outer peripheral edge fitting against said shoulder, the forward end of said outer annular wall being crimped inwardly to hold said cap in place, a part of said cap between the center thereof and the outer annular wall of said hollow body projecting forward of said hollow body.

8. A weldable hollow body for welding one end thereof to a welding surface having an aperture therein, said hollow body being a generally cylindrical ferrous body having an outer annular wall and an inner annular wall defining a generally cylindrical opening therein, an outer and an inner annular surface defining a recess at the end of said hollow body between said outer and inner annular walls, a shoulder in said outer annular surface, flux in said recess, a separable metal cap having an annular washer portion covering said recess and having an outer peripheral edge fitting against said shoulder, the forward end of said outer annular wall being crimped inwardly to hold said cap in place, said outer peripheral edge being of lesser peripheral length than said outer annular wall, a part of said cap between the center and the peripheral edge thereof extending forward of said hollow body, and said forwardly extending portion lying within the lateral boundaries of said hollow body.

References Cited in the file of this patent

UNITED STATES PATENTS

| | | |
|---|---|---|
| 2,402,659 | Nelson | June 25, 1946 |
| 2,413,370 | Palmer | Dec. 31, 1946 |
| 2,441,257 | Candy | May 11, 1948 |
| 2,455,244 | Evans | Nov. 30, 1948 |
| 2,638,525 | Candy | May 12, 1953 |